C. W. BERRY.
RECORDER.
APPLICATION FILED SEPT. 15, 1910.
1,216,272.
Patented Feb. 20, 1917.
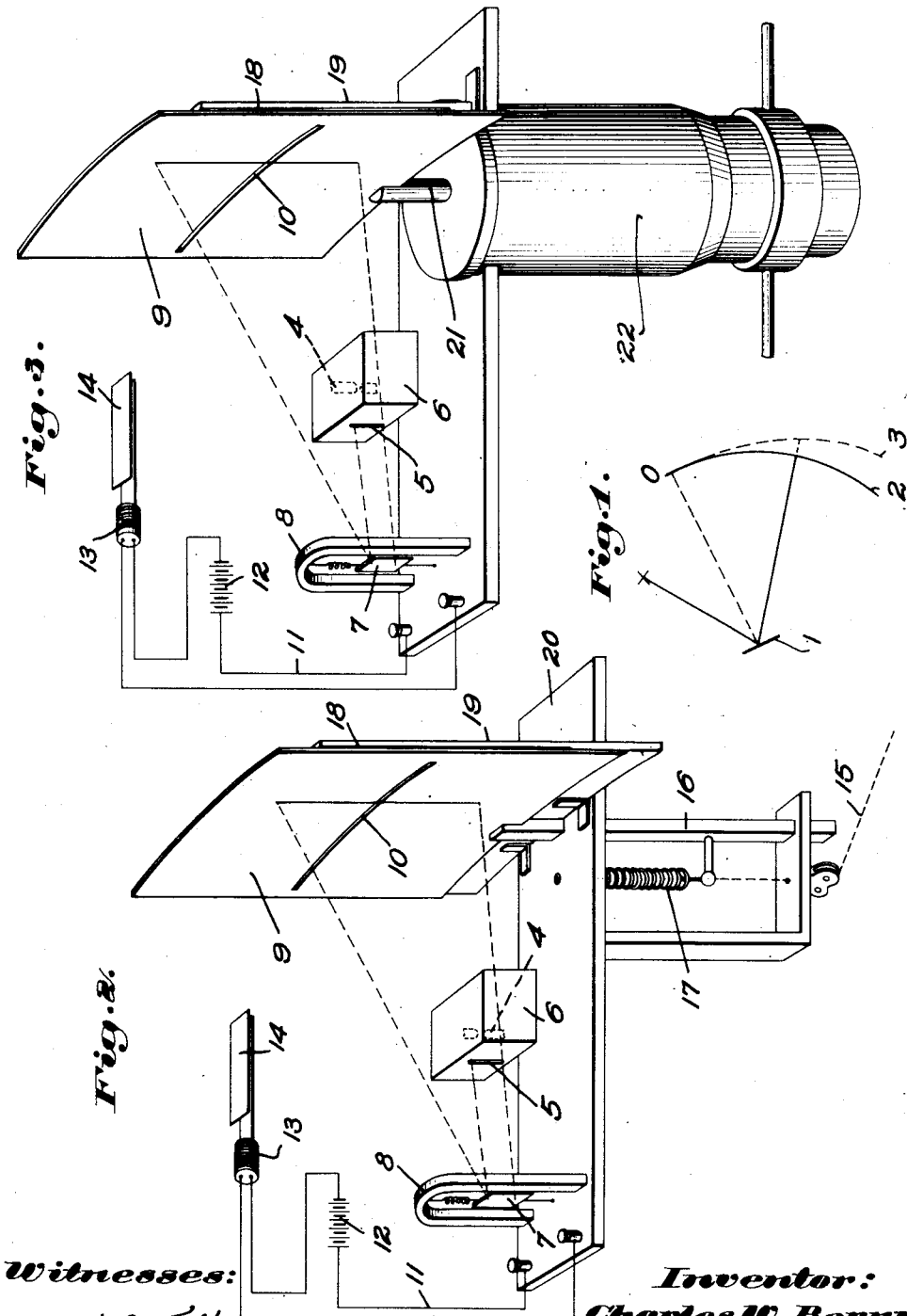

UNITED STATES PATENT OFFICE.

CHARLES W. BERRY, OF WEST SOMERVILLE, MASSACHUSETTS.

RECORDER.

1,216,272.  Specification of Letters Patent.  Patented Feb. 20, 1917.

Application filed September 15, 1910. Serial No. 582,151.

*To all whom it may concern:*

Be it known that I, CHARLES W. BERRY, a citizen of the United States, and a resident of West Somerville, county of Middlesex, State of Massachusetts, (whose post-office address is 952 Broadway, West Somerville, Massachusetts,) have invented an Improvement in Recorders, of which the following description, in connection with the accompanying drawings, is a specification, like letters on the drawings representing like parts.

This invention relates to recorders, comprising improvements in mechanisms for recording the varying properties of a gaseous fluid.

The invention will be best understood by reference to the following description when taken in connection with the accompanying illustration of one specific embodiment thereof, while its scope will be more particularly pointed out in the appended claims.

In the drawings:

Figure 1 shows an explanatory diagram;

Fig. 2 shows in skeleton form an indicator embodying one form of my invention for measuring temperature and volume variations of a fluid; and Fig. 3 shows an indicator quite similar in construction but for measuring temperature-pressure variations of a fluid.

Referring to the drawings and to the described embodiment of my invention, I have there shown a recording indicator wherein by means of electrical and optical devices, displacements of a spot of light are made to delineate the temperature fluctuations of a fluid, being utilized in conjunction with a second set of displacements perpendicular to the first, which by mechanical devices are made proportional to the variations in some other property of the fluid, such as the pressure or volume.

Such an instrument may be usefully employed not only for securing directly a record of the temperature-pressure or temperature-volume variations of the gas, but for drawing a closed diagram from which the work and heat diagrams may be constructed when it is impracticable to use a pressure-volume indicator either because the volume of the indicator piping and the indicator form too large a percentage of the cylinder volume, or because the pressure variations are very slight, or because of a non-cylindrical contour of the confining chamber, or because the variation in volume is not directly, or is only with difficulty, measurable, or for any other reason. A temperature-volume indicator would also find application upon the third or fourth stages of compound fluid compressors, while a temperature-pressure indicator could be used in any form of motor where none of the reciprocating parts is readily accessible, or where the construction of a suitable reducing motion would be difficult. Various other uses unnecessary to mention may be had for such an instrument.

Any suitable means for recording temperature variations in a gaseous fluid may be utilized, as for example, by measuring the temperature variations directly through electro-optical devices such as a sensitive galvanometer in circuit with two thermo-electric couples, one in circuit with the gas to be measured, or an oscillograph in circuit with an external electromotive force and a resistance ribbon forming the chief part of the total resistance of the circuit and constructed of such substance or alloy that its variation in electric resistance is practically proportional to the temperature variations in the surrounding fluid.

If such an instrument is placed, as represented in Fig. 1, with its mirror 1 at the center of a cylindrical surface 2, the displacement of the ray of light would be proportional to the temperature fluctuations provided the current fluctuations are proportional to the temperature fluctuations. In case the current fluctuations deviate slightly from a ratio of constant proportionality to the temperature, the calibration of the distorted record that would thus be produced by the measuring instrument may be automatically eliminated and a correct result obtained by distorting the surface from a true cylindrical form represented at 02 into the form at 03, so that, for the same angular deflection of the mirror, the perimetrical travel of the ray of light will be increased or decreased, as the case may be, by the proper amount. The path traced by the ray of light upon a photographic surface made to conform to the contour of such distorted surface when spread out flat would then be directly proportional to the temperature fluctuations. By thus adjusting the coutour of the cylindrical surface carrying the recording film to conform with the regularity or irregularity of the deflection produced by the current, a diagram may be obtained, the magnitudes of which are proportional to the temperatures. It is hereafter assumed that such adjustment is made when necessary.

Referring to Fig. 2, I have there shown a temperature-volume indicator for recording the temperature-volume variations of a fluid based upon the principle described. Referring to Fig. 2, light is emitted from any suitable source 4 through the slot 5 in the casing 6 so as to fall in the form of a sheet upon the mirror 7 of a sensitive galvanometer 8. From the galvanometer mirror it is reflected in a plane parallel with the axis of the mirror, so as to fall upon an opaque screen 9 in which is formed the transverse and herein horizontal slot 10.

The galvanometer is contained in an electric circuit 11, which latter includes the battery or other source of electromotive force 12, together with the plug 13, the latter being adapted to be inserted in the clearance space of an engine or compressor and carrying the very thin resistance ribbon 14. By suitably selecting the metal of which the ribbon is composed and designing the circuit so that the ribbon comprises a large portion of the resistance of the circuit, the current in the circuit will be made to vary substantially with the temperature changes in the ribbon, so that when the latter is introduced into the engine cylinder, or other fluid container, the ray of light will undergo deflections substantially proportional to the temperature changes in the gas. Platinum or platinum iridium compound or other resistance metals capable of withstanding a high degree of heat may be used for composing the ribbon 14.

The opaque screen 9 is given a vertical displacement under the influence of a cross head connection 15 proportional to the piston displacement. The screen is carried by any suitable support, such as the vertical sliding rod 16, the spring 17 providing for the return of the screen on the return stroke of the cross head.

Directly behind the screen is the sensitive plate, or preferably film, 18 carried by the fixed holder or backing 19 fastened to the stationary base 20.

The backing will be curved like the walls of a cylinder, with the axis of the mirror as the center of curvature, if the mirror deflections are proportional to temperature changes, the film and screen being shaped to conform to the backing. If the deflections of the mirror are not proportional to temperature changes but depart more or less from strict proportionality, the shape of the backing and the film and screen will be altered accordingly in accordance with the principles stated to present a calibrating shape and to provide for the automatic calibration or correction of the instrument within itself.

In practice the entire device will be shielded by suitable means to guard against the influence of external sources of light and against the effect upon the sensitized recording surface of light other than that received through the slot 10.

In Fig. 3 I have shown a modified form of indicator where direct temperature and pressure measurements are utilized. The construction and operation of this indicator is substantially the same as that of the temperature-volume indicator described, the screen 9, however, being given a vertical reciprocation by means of a piston rod 21 connected to a piston (not shown) contained within an ordinary indicator cylinder 22, which latter has connections by appropriate piping with the engine cylinder so that the movements of the contained piston against an indicator spring are proportional to variations in the pressure of the fluid under measurement.

It will be evident that that portion of the light which is permitted to pass through the slot in the opaque screen constitutes the recording medium and possesses two mutually perpendicular motions with relation to the film which, in the case of the temperature-volume indicator, draws the temperature record for each position of the piston through the engine cycle and, in the case of the temperature-pressure indicator, draws the temperature record for each value of the pressure throughout the cycle.

Various other means may be used for securing the direct temperature measurement than the optical device herein shown and while I have herein shown the details of a specific form of instrument such disclosure is for illustrative purposes, it being understood that the invention is not limited to the particular details herein shown nor to any particular manner of producing the temperature-caused or other displacements of the recording parts, but that extensive deviations may be made from the illustrated embodiment of the invention without departing from the spirit thereof.

Claims:

1. A device for recording variations in the conditions of a fluid comprising a recording element, means for holding a recording surface and means for producing two mutually perpendicular displacements between the said element and surface, one following fluctuations in the temperature and the other following fluctuations in the volume of said fluid.

2. In a temperature indicator the combination with a source of light of means for holding a sensitized surface, an oscillating reflector, an opaque screen for said surface containing a slot in a plane normal to the axis of rotation of the reflector, electrical devices for imparting to the mirror a deflection such that the displacement of the reflected ray of light upon the sensitized surface is proportionate to the temperature producing such deflection, and means for producing a relative displacement between the screen and the sensitized surface normal to the first displacement and proportional to the volume of the fluid substance undergoing said temperature fluctuations.

3. In an electrical temperature indicator the combination with an optical recorder responsive to temperature fluctuations, said recorder having a movement deviating from a ratio of constant proportionality to the temperature, of a recording surface having a suitable predetermined shape to render the total displacement of the light ray on the said surface proportional to the change of temperature.

4. In an electrical temperature indicator the combination with an optical recorder responsive to temperature fluctuations, of a recording surface, said recorder having means for applying a recording ray to said surface and the latter having a suitable predetermined shape to render the total displacement of the light ray on the said surface proportional to the change of temperature, and means for producing a mutually perpendicular relative displacement between the point of application of the recording ray and the surface proportional to variations in some other property of the fluid.

5. In an electrical temperature indicator the combination with an optical recorder responsive to temperature fluctuations, of a recording surface, said recorder having means for applying a recording ray thereto and said surface having a suitable predetermined shape to render the total displacement of the light ray on the said surface proportional to the change of temperature, and means for producing a mutually perpendicular relative displacement between the point of application of the recording ray and the surface proportional to the volume of the fluid.

6. In an optical temperature indicator, the combination with thermo-electrical responsive means for producing a ray of light of a recording surface so shaped as to make the thereupon induced deflections of the ray of light directly proportional to temperature changes producing such deflections.

7. In an optical temperature indicator, the combination with thermo-electrical responsive means for producing deflections of a ray of light of a recording surface so shaped as to make the thereupon induced deflections of the ray of light directly proportional to the temperature changes producing such deflections, and means for producing a second relative displacement between the recording surface and the point of application of the ray of light perpendicular to the deflections of the light ray.

8. In an indicator, the combination with a recording surface, of means for producing and oscillating a ray of light, means for making the thereupon induced deflections of the ray of light directly proportional to the temperature changes producing such oscillations, and means for producing a second displacement between the recording surface and the ray of light perpendicular to the first displacement, and proportional to variations in the volume of the fluid undergoing said temperature fluctuations.

In testimony whereof, I have signed my name to this specification, in the presence of two subscribing witnesses.

CHARLES W. BERRY.

Witnesses:
 THOMAS B. BOOTH,
 ROBERT H. KAMMLER.